US012264507B2

(12) United States Patent
Müller et al.

(10) Patent No.: US 12,264,507 B2
(45) Date of Patent: Apr. 1, 2025

(54) ANTI-THEFT DEVICE, IN PARTICULAR FOR TEXTILE PRODUCTS

(71) Applicant: rapitag GmbH, Munich (DE)

(72) Inventors: Sebastian Müller, Munich (DE); Alexander Schneider, Munich (DE)

(73) Assignee: rapitag GmbH, Munich (DE)

( * ) Notice: Subject to any disclaimer, the term of this patent is extended or adjusted under 35 U.S.C. 154(b) by 511 days.

(21) Appl. No.: 17/380,286

(22) Filed: Jul. 20, 2021

(65) Prior Publication Data

US 2022/0025677 A1 Jan. 27, 2022

(30) Foreign Application Priority Data

Jul. 22, 2020 (DE) .................... 10 2020 209 216.8

(51) Int. Cl.
*E05B 73/00* (2006.01)
*E05B 47/00* (2006.01)
*E05B 51/00* (2006.01)

(52) U.S. Cl.
CPC ...... *E05B 73/0017* (2013.01); *E05B 47/0009* (2013.01); *E05B 51/005* (2013.01)

(58) Field of Classification Search
CPC .. E05B 69/00; E05B 73/0017; E05B 47/0009; E05B 73/0029; E05B 51/005
See application file for complete search history.

(56) References Cited

U.S. PATENT DOCUMENTS

| | | | | |
|---|---|---|---|---|
| 7,215,250 | B2 * | 5/2007 | Hansen | E05B 73/0017 340/572.9 |
| 8,341,958 | B2 * | 1/2013 | Brown | F03G 7/065 60/527 |
| 9,734,683 | B1 * | 8/2017 | Perez | E05B 73/0017 |
| 10,024,082 | B2 * | 7/2018 | Marsh | E05B 37/00 |
| 11,761,247 | B2 * | 9/2023 | Miller | E05B 73/0064 340/572.1 |
| 2004/0100385 | A1 * | 5/2004 | Hansen | E05B 73/0017 340/572.9 |
| 2010/0097223 | A1 * | 4/2010 | Kruest | E05B 47/0009 340/572.1 |
| 2010/0259392 | A1 * | 10/2010 | Chamandy | E05B 73/0017 340/572.8 |
| 2010/0308998 | A1 * | 12/2010 | Hesch, Jr. | E05B 73/0017 340/572.8 |

(Continued)

FOREIGN PATENT DOCUMENTS

| | | |
|---|---|---|
| DE | 202019101192 U1 | 6/2020 |
| DE | 102019204779 A1 | 10/2020 |

(Continued)

*Primary Examiner* — Christine M Mills
*Assistant Examiner* — Faria F Ahmad
(74) *Attorney, Agent, or Firm* — Kilpatrick Townsend & Stockton LLP

(57) ABSTRACT

The invention relates to an anti-theft device configured to be attached to merchandise to be protected, in particular textile products, comprising a housing and a locking mechanism, which is received in the housing at least in part and comprises a securing element, wherein the securing element is adjustable between a securing position, in which it engages with the merchandise to be protected, and a release position, in which detachment and removal of the anti-theft device from the merchandise to be protected are permitted.

16 Claims, 6 Drawing Sheets

(56) References Cited

U.S. PATENT DOCUMENTS

| | | | | |
|---|---|---|---|---|
| 2011/0050427 | A1* | 3/2011 | Skjellerup | E05B 73/0064 340/572.8 |
| 2011/0254661 | A1* | 10/2011 | Fawcett | G08B 13/1445 340/5.61 |
| 2011/0273295 | A1* | 11/2011 | Sayegh | G06K 7/10207 340/572.1 |
| 2013/0119145 | A1* | 5/2013 | Yang | G08B 13/2434 235/492 |
| 2015/0013398 | A1 | 1/2015 | Taylor et al. | |
| 2017/0330435 | A1* | 11/2017 | Skjellerup | E05B 73/0064 |
| 2020/0291690 | A1* | 9/2020 | Claeys | E05B 73/0017 |
| 2020/0399933 | A1* | 12/2020 | Kelsch | E05B 35/008 |
| 2021/0012634 | A1* | 1/2021 | Claeys | E05B 47/0009 |

FOREIGN PATENT DOCUMENTS

| | | | | | |
|---|---|---|---|---|---|
| GB | 2530855 | A | * | 4/2016 | E05B 73/00 |
| GB | 2552213 | A | * | 1/2018 | E05B 73/00 |
| GB | 2569155 | A | * | 6/2019 | E05B 73/0029 |
| GB | 2594268 | A | * | 10/2021 | E05B 73/0029 |
| WO | 2010045398 | A1 | | 4/2010 | |
| WO | 2019141781 | A1 | | 7/2019 | |

* cited by examiner

ANTI-THEFT DEVICE, IN PARTICULAR FOR TEXTILE PRODUCTS

CROSS-REFERENCE TO RELATED APPLICATIONS

This application claims priority to German Patent Application No. 10 2020 209 216.8, filed in Germany on Jul. 22, 2020, the entire contents of which are hereby incorporated herein by this reference.

The invention relates to an anti-theft device configured to be attached to merchandise to be protected, in particular textile products, comprising a housing and a locking mechanism, which comprises a securing element, the securing element being adjustable between a securing position, in which it engages with the merchandise to be protected, and a release position, in which detachment and removal of the anti-theft device from the merchandise to be protected are permitted.

Anti-theft devices of this kind are well known and have been preferentially used for many years in the field of stores open to the public, as they provide sufficient protection against unauthorized removal from the store, or from or a demarcated sales area within said store, of merchandise sold therein. For this purpose, appropriate detector units are usually provided at all entrances and exits of the store, or of any demarcated sales areas therein, and these are designed and intended to emit an acoustic and/or visual warning signal if a customer attempts to remove from the store or sales area any protected merchandise to which an anti-theft device of this kind is attached.

A generic anti-theft device is disclosed in the applicant's German patent application with the official file reference 10 2019 204 779.3. The locking mechanism described therein comprises a slider that can be engaged with a needle-receiving element in order to lock the needle-receiving element, by a needle attached thereto, in the securing position. To transfer the needle-receiving element from the securing position to the release position, the slider is connected to a wire made of a shape-memory alloy (hereinafter sometimes referred to in short as an "SMA wire"), which can be heated by applying an electrical voltage. As a result, the SMA wire contracts, whereby the slider can be disengaged from the needle-receiving element and the needle-receiving element can be moved from the securing position to the release position.

Although this kind of embodiment of the locking mechanism is a reliable way of opening the generic anti-theft device, it has disadvantages in that a relatively long SMA wire has to be used to move the slider since the amount by which the length of a wire can shorten is usually only about 3-5% of the length of the SMA wire. However, using a long SMA wire is not only disadvantageous in terms of the necessary installation space, but it also results in increased power consumption, which entails frequent charging or replacement of the battery of an anti-theft device of this kind.

In addition, the generic anti-theft device in DE 10 2019 204 779.3 has a substantially circular shape, which can make it difficult to position the needle precisely when attaching the anti-theft device to textile products and can thus lead to unintentional damage to these textile products.

The object of the present invention is therefore to remedy this situation.

According to a first aspect of the present invention, this object is achieved by an anti-theft device of the type mentioned at the outset in which the locking mechanism further comprises at least two guide openings which are displaceable relative to one another and through which the securing element is guided, a guide element, in which at least one of the at least two guide openings is formed, the guide element having a first position, in which the at least two guide openings are positioned relative to one another in such a way that movement of the securing element from the securing position to the release position is prevented, and a second position, in which the at least two guide openings are positioned relative to one another in such a way that movement of the securing element from the securing position to the release position is permitted, and a wire, which is made at least in part of a shape-memory alloy (hereinafter also "SMA wire"), is operatively connected to the guide element, and is configured to transfer the guide element from the first position to the second position.

Preferably, the securing element is in the form of a needle or a locking pin. In the first position, the positioning of the at least two guide openings relative to one another is preferably selected in such a way that a clamping action, i.e., a clamping force, is exerted on the securing element. In the second position, however, the relative position of the at least two guide openings is preferably selected in such a way that the securing element can move freely, in particular independently, from the securing position to the release position. As a result, the SMA wire only has to travel over a comparatively short actuation path to transfer the guide element to the second position and thus allow the securing element to move from the securing position to the release position. A comparatively short SMA wire can thus be used, resulting in reduced installation space requirements, lower power consumption, and reduced material costs for the SMA wire.

In principle, the at least one guide opening of the at least two guide openings may be formed on the guide element whereas another guide opening of the at least two guide openings may be formed on the housing or on a part connected thereto. To implement particularly precise needle guidance, according to an embodiment example of the invention it is proposed that, furthermore, at least one other guide opening of the at least two guide openings is formed on the guide element.

To be able to ensure that the guide element can independently return to the first position after being actuated by the SMA wire in order to allow the securing element to be locked back in the securing position, according to an embodiment example it is proposed that the guide element is preloaded, in particular spring-biased, into the first position. This can be achieved, for example, by the guide element itself simply having sufficient resilience.

According to a further embodiment example, the at least one guide opening of the at least two guide openings can have a substantially oval contour and/or at least one other guide opening of the at least two guide openings can have a substantially circular contour. As a result, the at least one guide opening having the substantially oval contour can be used primarily for blocking or releasing the movement of the securing element, whereas the at least one further guide opening having the substantially circular contour can be used primarily for guiding the securing element, in particular substantially transversely to its direction of movement.

Additionally or alternatively, the at least one guide opening of the at least two guide openings can be displaceable relative to the housing and/or at least one other guide opening of the at least two guide openings can be arranged immovably relative to the housing. Similarly, the at least one guide opening that is displaceable relative to the housing can be used primarily for blocking or releasing the movement of the securing element, whereas the at least one further guide opening that is arranged substantially immovably relative to the housing can be used primarily for guiding the securing element, in particular substantially transversely to its direction of movement.

If the at least one guide opening of the at least two guide openings has the substantially oval contour and the at least one other guide opening of the at least two guide openings has the substantially circular contour, it is additionally conceivable according to an embodiment example that the substantially circular guide opening is arranged immovably relative to the housing and the substantially oval guide opening is displaceable relative to the housing.

To be able to configure the guide element so as to be particularly compact and at the same time functionally reliable, the guide element can have a curved shape, preferably substantially a C-shape or an S-shape. If the guide element is S-shaped, three guide openings can accordingly be provided for guiding the securing element. By way of example, if three of the guide openings are provided, one of the three guide openings may have the substantially circular contour and two of the three guide openings may have the substantially oval contour.

In principle, the SMA wire can be connected to the housing, or to a part fastened thereto, at one end, and to the guide element, or to a part connected thereto, at the other end. For this purpose, however, the excitation circuit for heating the SMA wire must run through the guide element, as a result of which the securing element, and thus the merchandise to be protected, may also be energized. To counter this circumstance, in a development of this embodiment example it is proposed that both ends of the SMA wire are held in place immovably relative to the housing, a contact portion of the SMA wire in between said two ends being in contact with the guide element, or with a part connected thereto, in such a way that, upon shortening of the SMA wire, the guide element is transferred from the first position to the second position. As a result, the electrical excitation circuit can be established in a simple manner while at the same time preventing the guide element, and thus the securing element, from being necessarily energized.

According to a first alternative embodiment, the guide element may be made of an electrically conductive material, preferably sheet metal. However, in order to prevent electrical contact between the guide element and the SMA wire in this case, insulation can additionally be provided in a contact region between the guide element and the SMA wire.

If this insulation is to be omitted, in accordance with a second alternative embodiment the guide element can be made of an electrically non-conductive material. However, if the electrically non-conductive material should also have low thermal conductivity, it is then preferred if the electrically non-conductive material further has sufficient thermal resistance to provide the guide element with adequate resistance to the heat generated by the application of the voltage to the SMA wire.

In addition, to allow the anti-theft device to be removed from the merchandise to be protected particularly quickly and conveniently as soon as the guide element has assumed the second position and has thus released the movement of the securing element from the securing position to the release position, according to a further embodiment example it is proposed that the securing element is preloaded, in particular spring-biased, into the release position.

Moreover, in order for the anti-theft device to have a sufficient degree of freedom with respect to different methods and/or locations for being attached to merchandise to be protected, the housing may further have a cut-out that preferably extends substantially radially, the cut-out being configured to receive at least one part of the merchandise to be protected. By way of example, the cut-out may take the form of a slit along a sectional plane running substantially in parallel with a main plane of the housing. Preferably, however, in the extension direction running substantially orthogonally to the main plane of the housing, the cut-out is only so pronounced to the extent that it runs between two wall portions of the housing that are located above and below the main plane of the housing. In addition, in the radial direction the cut-out may have a predetermined extent that is, for example, only about half the radial extent of the housing or less.

In this context, it should also be noted that the securing element is preferably arranged in the region of this cut-out such that the securing element can pierce the part of the merchandise to be protected that is accommodated within said cut-out. A huge range of variants are conceivable with regard to the positioning of the securing element in relation to the cut-out. The securing element can, for example, be positioned centrally in relation to the cut-out or also at an outer edge region of the cut-out.

According to a second aspect of the present invention, which can preferably be combined with the first aspect, the object is achieved by an anti-theft device of the type mentioned at the outset in which the locking mechanism further comprises a wire, which is made at least in part of a shape-memory alloy (sometimes referred to in short as “SMA wire”), and a guide element, which can be releasably engaged with the securing element and has a first position, in which movement of the securing element from the securing position to the release position is prevented, and a second position, in which movement of the securing element from the securing position to the release position is permitted, both ends of the wire being held in place immovably relative to the housing and a contact portion of the wire in between said two ends being in contact with the guide element, or with a part connected thereto, in such a way that, upon shortening of the wire, the guide element is transferred from the first position to the second position.

It should be noted at this point that ail the advantages and effects described in connection with the anti-theft device according to the first aspect also apply to the anti-theft device according to the second aspect. Furthermore, according to the invention, the SMA wire can be contacted at its two ends in a simple manner to be able to establish the electrical excitation circuit.

Preferably, the SMA wire can be substantially V-shaped when in the installed state ready for operation. In this way, the actuation path of the guide element that can be achieved by the SMA wire can be increased compared with the generic anti-theft device.

According to a third aspect of the present invention, which can preferably be combined with the first and/or the second aspect, the object is achieved by an anti-theft device of the type mentioned at the outset in which the housing has a first end portion, which forms an engagement portion in which the locking mechanism is arranged, and a second end portion, which is opposite the first end portion and forms a handling portion provided for handling the anti-theft device, the housing having a width in the region of the first end portion that is less than a width of the housing in the region of the second end portion.

Preferably, the width of the housing corresponds to the extent of the housing in a direction running substantially orthogonally to a plane that contains the movement direction of the securing element.

Compared with generic anti-theft, devices, the anti-theft device according to the third aspect of the invention is characterized firstly in that the anti-theft device is easier to attach to merchandise to be protected, in particular textile products, since the housing has the smaller width in the region of the first end portion and the securing element can consequently be positioned more precisely on the merchandise to be protected. Secondly, the anti-theft device according to the second aspect of the invention is more secure against misuse since the leverage achievable in the first end portion in the region of the locking mechanism in the event of an attempt to open the anti-theft device by force, for example in the event of an attempt to bend the anti-theft device open by means of a screwdriver or the like, is reduced. Moreover, the second, wider end portion can ensure safe handling of the anti-theft, device and provide sufficient installation space for other functional elements of the anti-theft device that are to be accommodated in and/or attached to the housing.

In addition, to be able to ensure that, while attached to the merchandise to be protected, the anti-theft device does not tend to snag on the textile product itself or interfere with the wearing comfort to an unacceptable extent, for example when a potential customer or the like is trying said product on, according to an embodiment example the width of the housing may decrease substantially continuously and/or gradually from the second end portion toward the first end portion.

Additionally or alternatively, the housing may be substantially teardrop-shaped when viewed in plan view.

The invention will now be described with reference to a number of embodiment examples on the basis of the accompanying drawings, in which.

Figure 3A:
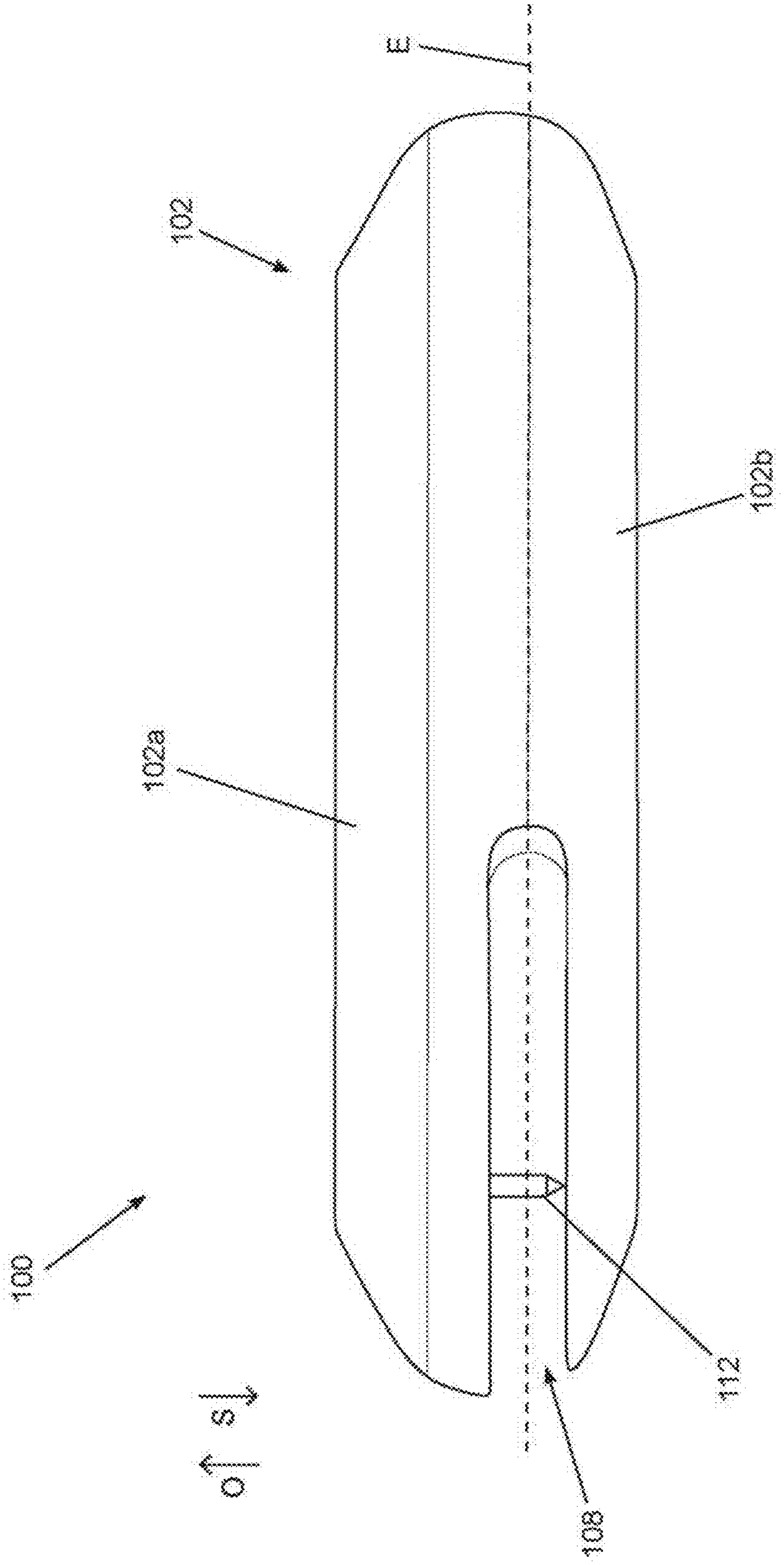
Figure 3B:
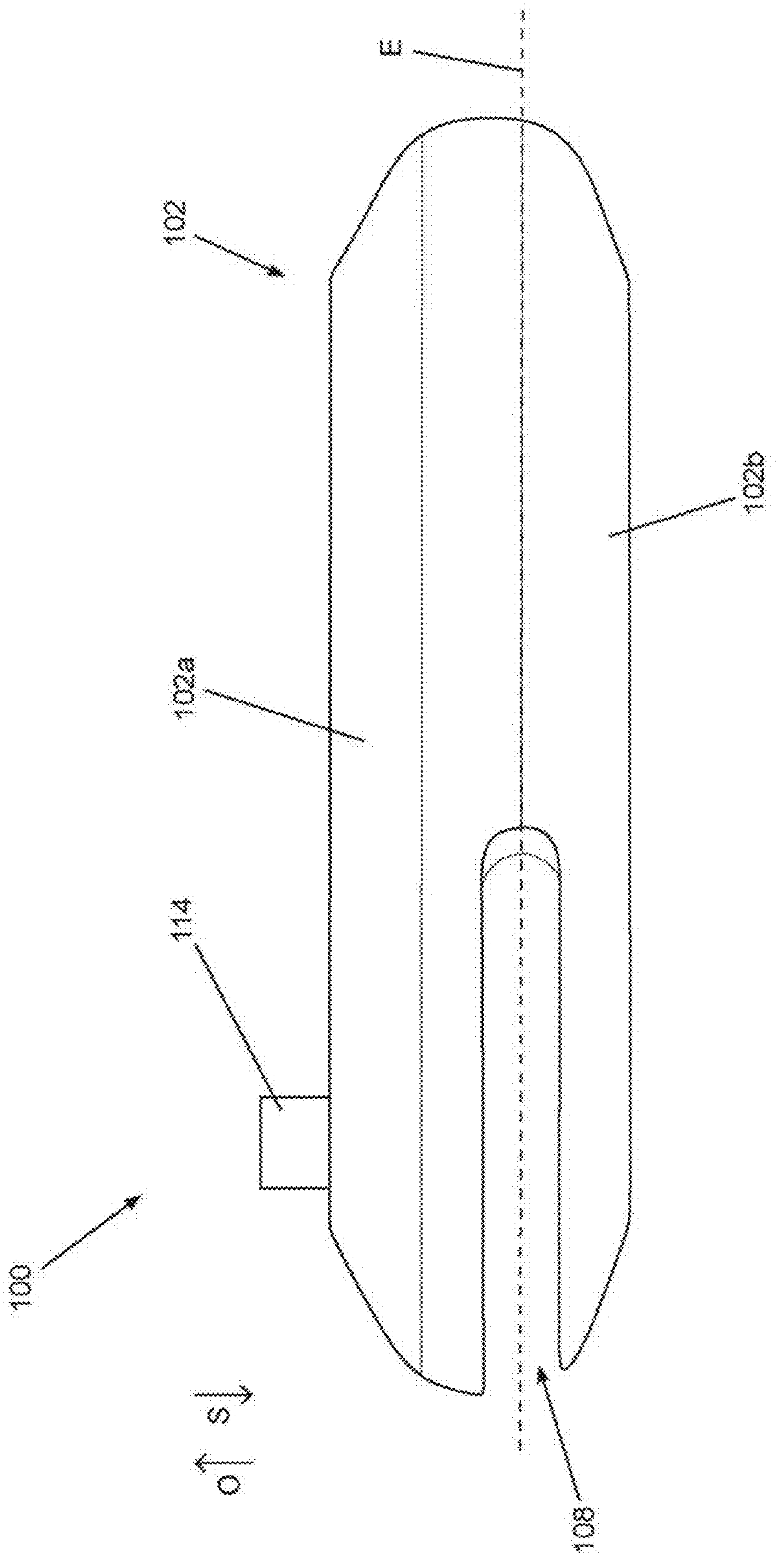
Figure 4A:
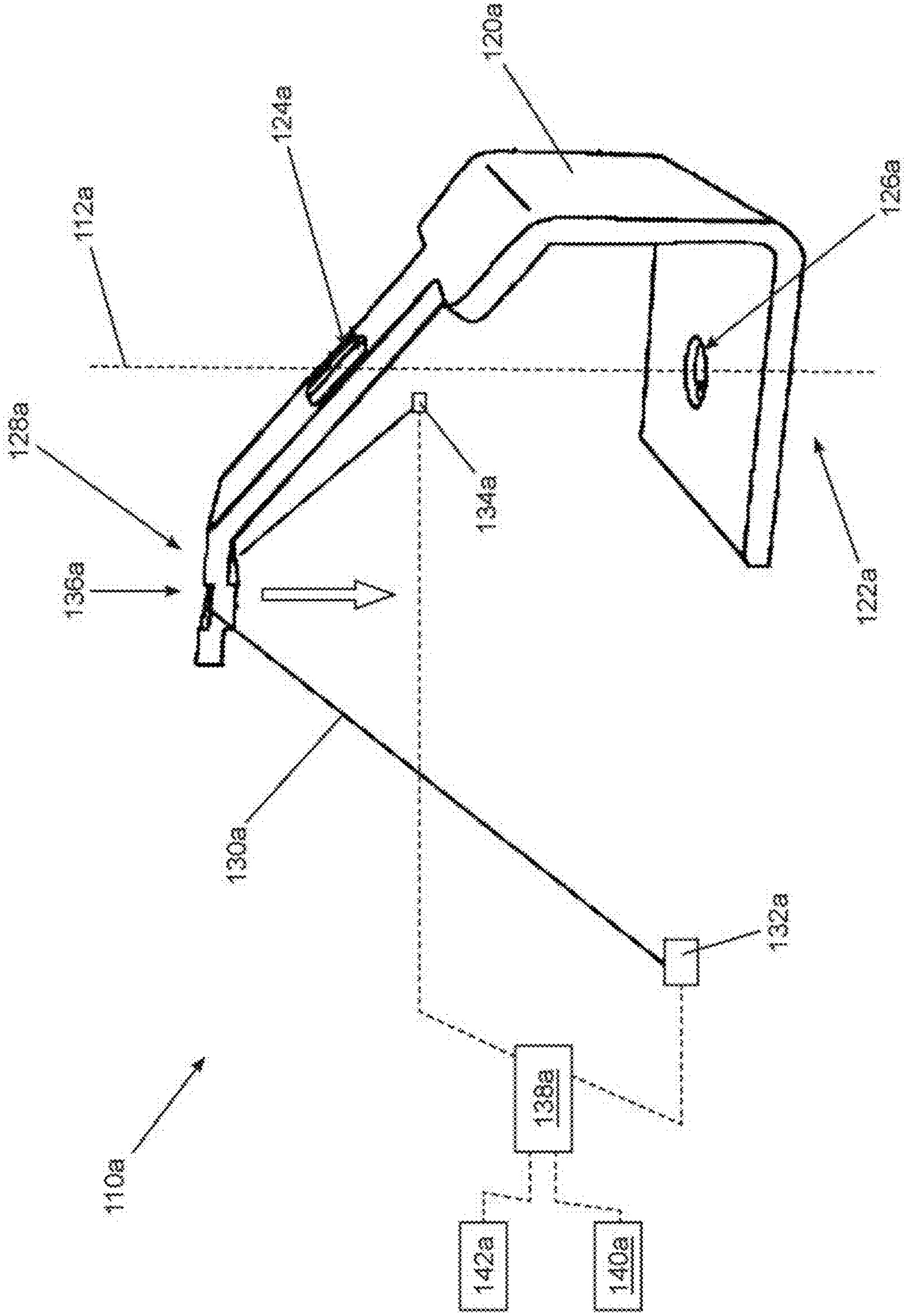
Figure 4B:
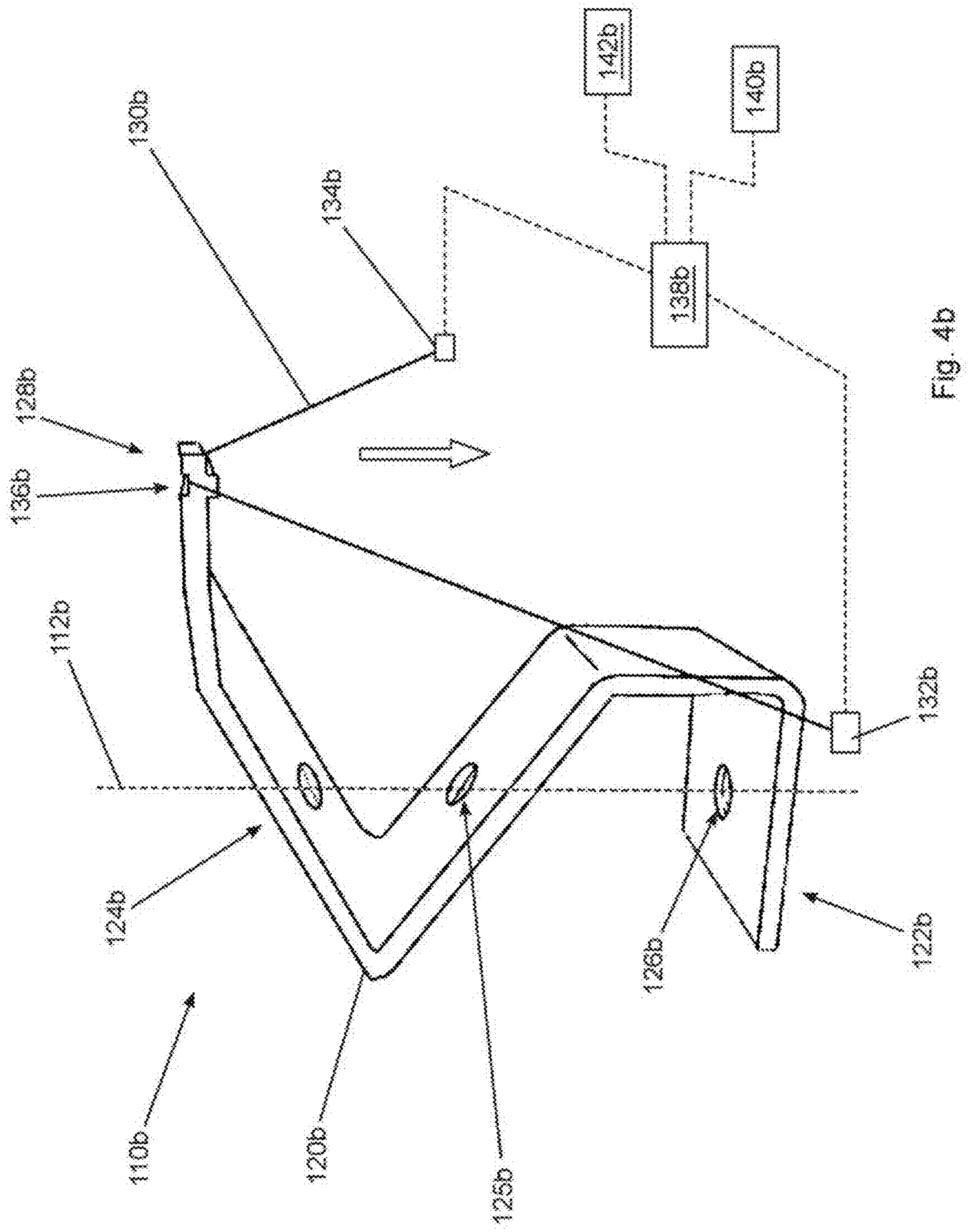

FIG. 3*a* is a side view of the anti-theft, device according to the invention in a locked state;

FIG. 3*b* is a side view of the anti-theft device according to the invention in an unlocked state;

FIG. 4*a* is a perspective view of a first embodiment example of a locking mechanism for the anti-theft, device according to the invention; and FIG. 4*b* is a perspective view of a second embodiment example of the locking mechanism for the anti-theft device according to the invention.

In FIGS. 1, 2, 3*a* and 3*b*, an anti-theft device according to the invention is denoted in general by 100.

The anti-theft device 100 comprises a housing 102 which, in the embodiment example shown, is formed from an upper housing part 102*a* and a lower housing part 102*b* arranged opposite thereto. The housing 102 comprises a first end portion 104 and a second end portion 106 opposite thereto, which forms a handling portion of the housing 102, i.e., is provided for a user to handle the anti-theft device. To attach the anti-theft device 100 to merchandise to be protected, e.g., textile products, the anti-theft device 100 comprises a locking mechanism, which is denoted in general by 110 and is arranged in the region of the first end portion 104. The first end portion 104 thus forms an engagement portion, which is provided for engagement with merchandise to be protected.

Figure 2:
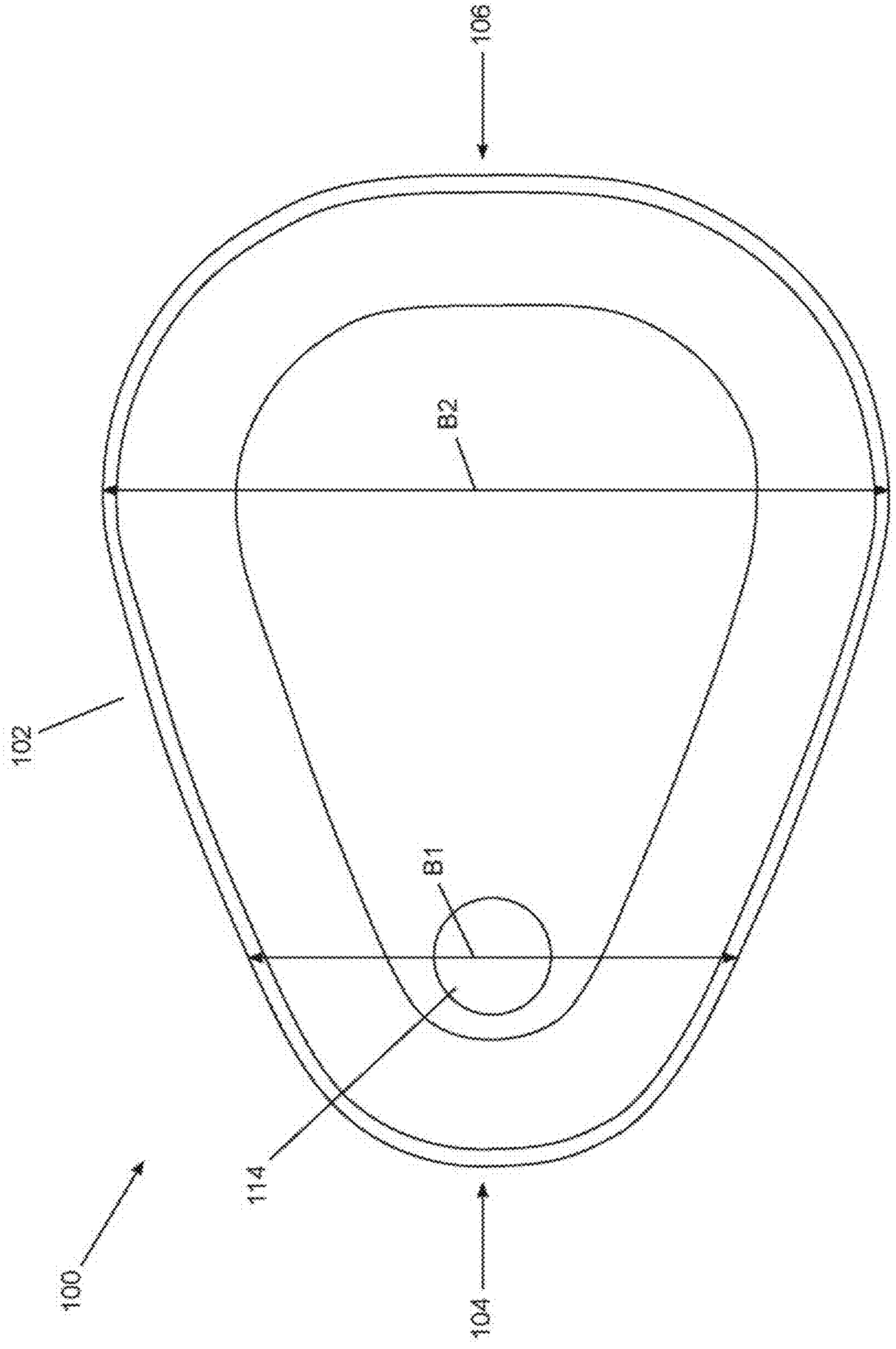
FIG. 2 is a plan view of the anti-theft device according to the invention.

With reference to FIG. 2, which is a plan view of the anti-theft device 100 according to the invention, it can be seen that the housing 102 has a width B1 in the region of the first end portion 104 that is less than a width B2 of the housing 102 in the region of the second end portion 106. The smaller width B1 in the region of the first end portion 104 allows the anti-theft device 100, in particular a securing element in the form of a needle 112, to be precisely positioned on the merchandise to be protected, whereas the larger width B2 in the region of the second end portion 106 ensures secure handling of the anti-theft device 100 and provides an adequate construction for other functional elements of the anti-theft device 100 that are to be accommodated in and attached to the housing 102.

To engage with a part of an item of merchandise to be protected (not shown); such as a part of a textile product, the anti-theft device 100 further comprises a cut-out 108 that extends substantially radially. In the embodiment example shown, the cut-out is in the form of a slit along a sectional plane running substantially in parallel with a main plane E (see FIGS. 3*a* and 3*b*) of the housing 102. To be able to attach the anti-theft device 100 to the merchandise to be protected, the locking mechanism 110 comprises the securing element, in the form of a needle 112, in the region of the cut-out 108. Alternatively, however, the securing element can also be in the form of a securing pin or the like. The needle 112 is attached to a needle-receiving element 114, which is arranged on the top housing half 102*a* so as to be slidable substantially orthogonally to the main plane E of the housing 102.

In FIG. 3*a*, the needle 112 is in a securing position, in which it can pierce the part of an item of merchandise to be protected, for example the textile product part that is received in the cut-out 108, in such a way that the anti-theft device 100 is securely connected to the merchandise to be protected. Consequently, as long as the needle 112 is in the securing position, the merchandise to be protected and the anti-theft device 100 cannot be separated from each other, or at least not without destroying the merchandise to be protected at least in part.

To transfer the anti-theft device 100 from the locked state shown in FIG. 3*a* to the unlocked state shown in FIG. 3*b*, the needle-receiving element 114, which is slidably attached to the top housing half 102*a*, is moved, preferably with assistance from a spring accommodated in the top housing half 102*a* and operatively connected to the needle-receiving element 114, out of the housing 102 in an opening direction O indicated in FIGS. 3*a* and 3*b* such that it protrudes from the housing 102 in a direction running substantially orthogonally to the main plane E of the housing 102. This results in the needle 112, which is rigidly connected to the needle-receiving element 114, being raised in such a way that the cut-out 108 is substantially completely vacated. Consequently, in FIG. 3*b*, the needle 112 is in a release position, in which detachment and removal of the anti-theft device 100 from the merchandise to be protected are permitted. In the release position, the needle 112 is preferably accommodated entirely within the top housing half 102*a* so as to prevent the merchandise to be protected from potentially snagging on a pointed end of the needle 112 when the anti-theft, device 100 is removed.

If the anti-theft device 100 is to be transferred back to the locked state shown in FIG. 3*a* from the unlocked state shown in FIG. 3*b*, this can be done, for example, by lowering the needle-receiving element 114 substantially completely back into the top housing half 102*a* by manual actuation in accordance with a closing direction S indicated in FIGS. 3*a* and 3*b*, such that the needle 112 connected to the needle-receiving element 114 resumes the securing position shown in FIG. 3*a* and preferably remains in this position.

Figure 1:
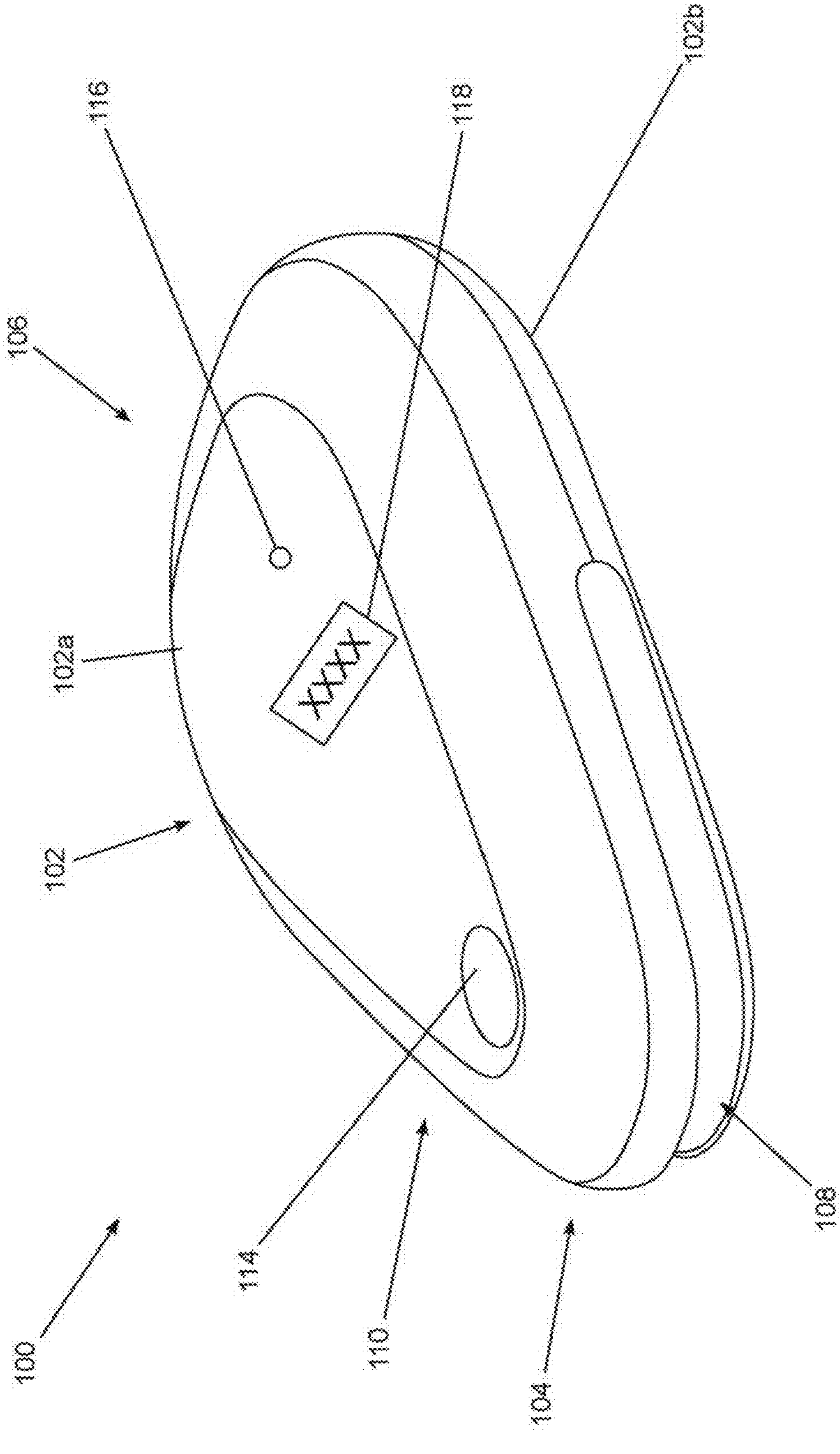
FIG. 1 is a perspective view of art anti-theft device according to the invention.

Lastly, FIG. 1 also shows an LED light source 116 arranged on an outer surface of the top housing half 102*a*, which LED light source may be in the form of a colored LED light source and is configured, for example, to indicate a status of the anti-theft device 100. For instance, the LED light source 116 may illuminate red when the anti-theft device 100 is in a locked state, whereas it may illuminate green, for example, when the anti-theft device 100 is in an unlocked state. Additionally or alternatively, a display 118 may further be provided on the housing 102 and may be implemented as an eInk display, for example. By means of the display 118, for example, information may be displayed concerning the merchandise protected by the anti-theft device 100, such as a price, a condition of the anti-theft device, or the like.

Embodiment examples of the locking mechanism as able to be installed on the anti-theft device 100 according to the invention will now be described with reference to FIGS. 4*a* and 4*b*.

In FIG. 4*a*, a first embodiment example of the locking mechanism is denoted in general by 110*a*. The locking mechanism 110*a* comprises a needle 112*a*, which may correspond to the needle 112 described above but is only indicated schematically in FIG. 4*a*. To guide the needle 112*a*, a guide element 120*a* is provided in the form of a substantially C-shaped guide plate 120*a*, which may be rigidly connected to the housing 102 of the anti-theft device 100 in the region of its bottom portion 122*a*. The guide plate 120*a* comprises a guide opening 124*a* and another guide opening 126*a*, which are displaceable relative to one another. The guide opening 124*a* has a substantially oval contour and the further guide opening 126*a* has a substantially circular contour. Consequently, the further guide opening 126*a* arranged in the region of the bottom portion 122*a* is arranged immovably relative to the housing 102, whereas the guide opening 124*a* can be displaced relative to the housing 102, and thus relative to the further guide opening 126*a*, by an upper end portion 128*a* of the guide plate 120*a* moving in and counter to an arrow direction shown in FIG. 4*a*.

In FIG. 4*a*, the guide element 120*a* is shown in a first position, in which the two guide openings 124*a* and 126*a* are positioned relative to one another in such a way that movement of the needle 112*a* from the above-mentioned securing position to the release position is prevented.

To transfer the guide plate 120*a* to a second position, in which the two guide openings 124*a*, 126*a* are to be positioned relative to one another in such a way that movement of the needle 112*a* from the securing position to the release position is permitted, a wire 130 is provided, made of a shape-memory alloy (SMA wire). In the process, both ends 132*a*, 134*a* of the wire 130*a* are held in place immovably relative to the housing 102, or are fastened thereto, and a contact portion 136*a* of the wire 130*a* in between the two ends 132*a*, 134*a* is stretched over the upper end portion 128*a* of the guide plate 120*a* in such a way that the wire 130*a* is arranged substantially in an inverted V-shape. Connected to the two ends 132*a*, 134*a* of the wire 130*a* is a wire activation unit 138*a*, for example in the form of a switching unit, a chip unit, or the like, which may be accommodated in the housing 102 and is also only indicated schematically in FIG. 4*a*. A power supply unit, for example in the form of a battery 140*a*, which is operatively connected to the wire activation unit 138*a* may in turn be provided for supplying electrical power to the wire activation unit 138*a* and thus to the SMA wire 130*a*.

When a voltage is applied by the wire activation unit 138*a*, the SMA wire 130*a* is heated and contracts, causing the contact portion 136*a*, and thus the upper end portion 128*a* of the guide plate 120*a*, to move downward in the direction of the arrow, which in turn results in a corresponding displacement of the guide opening 124*a*, and thus in the release of the needle 112*a* such that it can be transferred from the securing position to the release position, preferably with assistance from a spring (not shown) connected to the needle 112*a* at one end and to the housing 102 at the other end.

Preferably, the voltage is applied whenever a signal receiving unit 142*a* operatively connected to the wire activation unit 138*a* receives a corresponding opening signal, for example in the form of a token or the like, but this is also only indicated schematically in FIG. 4*a*.

Once the wire 130*a* has cooled again, the guide plate 120*a* can return, preferably under its own spring action, to the first position, in which movement of the needle 112*a* from the securing position to the release position is prevented but movement of the needle 112*a* from the release position to the securing position is permitted, thus allowing the anti-theft device 100 to be fastened again to merchandise to be protected. In this case, the needle 112*a* can be transferred from the release position to the securing position by, for example, manually actuating the needle-receiving element 114 (described above with reference to FIG. 3*b*) in the direction of the closing direction S, whereupon the needle 112*a* can remain in the securing position due to the damping force through the guide opening 124*a*.

A second embodiment example of a locking mechanism (denoted in general by 110*b*) for the anti-theft device 100 according to the invention is described with reference to FIG. 4*b*. Part of the structure of the locking mechanism 110*b* is identical to the embodiment example of the locking mechanism 110*a* described with reference to FIG. 4*a*. Therefore, like parts in FIG. 4*b* are provided with the same reference numerals as in FIG. 4*a* but with the additional letter "b" instead of the additional letter "a". Furthermore, the embodiment example of the locking mechanism 110*b* will be described only in so far as it differs from the embodiment example of the locking mechanism 110*a* of FIG. 4*a*, the description of which is otherwise expressly referred to herein.

In particular, the locking mechanism 110*b* is distinguished on account of a different guide plate 120*b*, which is substantially S-shaped. Furthermore, the guide plate 120*b* has an additional guide hole 125*b*, which can improve the guidance of the needle 112*b* and increase the damping force acting on the needle 112*b*. Disadvantageously, however, the necessary installation space in the direction substantially parallel to the needle 112*b* within the housing 102 may be higher compared with the locking mechanism 110*a*.

It should be added that the anti-theft device 100 further comprises an electronic article surveillance (EAS) element (not shown), which is preferably also accommodated in the housing 102 and is configured to interact with an electronic article surveillance system (not shown either) so that when a customer attempts to remove, without authorization, protected merchandise to which the anti-theft device 100 is attached, for example from a store, an alarm signal is emitted as soon as the merchandise passes a detector unit associated with the electronic article surveillance system.

The invention claimed is:

1. Anti-theft device configured to be attached to merchandise to be protected the anti-theft device comprising:

a housing, and a locking mechanism, which is received in the housing at least in part and comprises a securing element, the securing element being adjustable between a securing position, in which it engages with the merchandise to be protected, and a release position, in which detachment and removal of the anti-theft device from the merchandise to be protected are permitted, wherein the locking mechanism further comprises:

at least two guide openings, which are displaceable relative to one another and through which the securing element is guided, a guide element, in which at least one guide opening of the at least two guide openings is formed, the guide element having a first position, in which the at least two guide openings are positioned relative to one another in such a way that movement of the securing element from the securing position to the release position is prevented, and a second position, in which the at least two guide openings are positioned relative to one another in such a way that movement of the securing element from the securing position to the release position is permitted, and a wire, which is made at least in part of a shape-memory alloy, is operatively connected to the guide element, and is configured to transfer the guide element from the first position to the second position, wherein both ends of the wire are held in place immovably relative to the housing, a contact portion of the wire in between said two ends being in direct contact with the guide element in such a way that, upon shortening of the wire, the guide element is transferred from the first position to the second position wherein the at least one guide opening of the at least two guide openings has a substantially oval contour and at least one other guide opening of the at least two guide openings has a substantially circular contour.

2. Anti-theft device according to claim 1, wherein at least one other guide opening of the at least two guide openings is formed on the guide element.

3. Anti-theft device according to claim 1, wherein the guide element is preloaded into the first position.

4. Anti-theft device according to claim 3, wherein the guide element is spring-biased into the first position.

5. Anti-theft device according to claim 1, wherein the at least one guide opening of the at least two guide openings is displaceable relative to the housing and/or at least one other guide opening of the at least two guide openings is arranged immovably relative to the housing.

6. Anti-theft device according to claim 1, wherein the guide element has a curved shape.

7. Anti-theft device according to claim 6, wherein the guide element has either a C-shape or an S-shape.

8. Anti-theft device according to claim 1, wherein the guide element is made of an electrically conductive material.

9. Anti-theft device according to claim 1, wherein the guide element is made of an electrically non-conductive material.

10. Anti-theft device according to claim 1, wherein the securing element is preloaded into the release position.

11. Anti-theft device according to claim 10, wherein the securing element is spring-biased into the first position.

12. Anti-theft device according to claim 1, wherein the housing further has a cut-out configured to receive at least one part of the merchandise to be protected.

13. Anti-theft device according to claim 11, wherein the cut-out of the housing extends substantially radially.

14. Anti-theft device according to claim 1, wherein the housing has:

a first end portion (104), which forms an engagement portion in which the locking mechanism is arranged, and a second end portion, which is opposite the first end portion and forms a handling portion provided for handling the anti-theft device, the housing having a width (B1) in the region of the first end portion that is less than a width (B2) of the housing in the region of the second end portion wherein the width of the housing decreases substantially continuously from the second end portion toward the first end portion.

15. Anti-theft device according to claim 14, wherein the housing is substantially teardrop-shaped when viewed in plan view.

16. Anti-theft device according to claim 1, wherein the guide element is made of sheet metal.

* * * * *